A. JOHN.
CUSHION TIRE.
APPLICATION FILED JUNE 18, 1920.
1,398,862.
Patented Nov. 29, 1921.
2 SHEETS—SHEET 1.
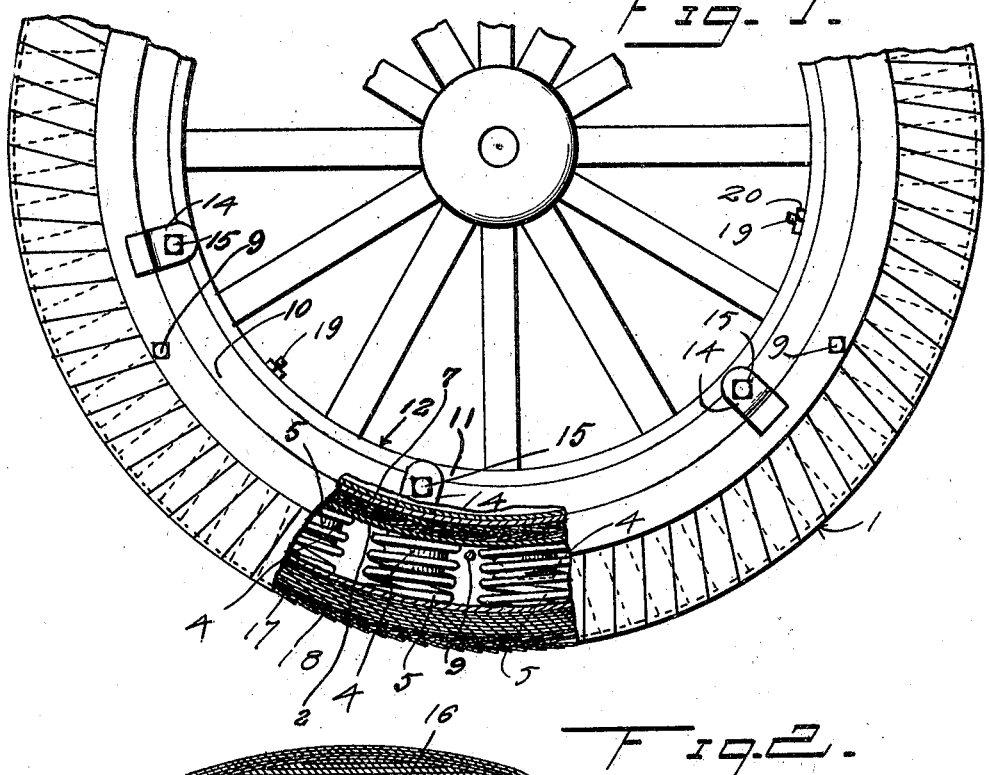
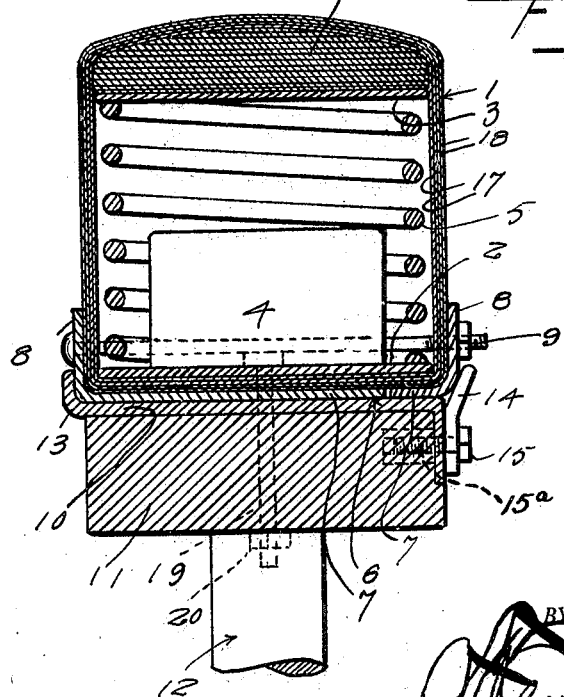
INVENTOR.
Adam John
BY
ATTORNEY.

A. JOHN.
CUSHION TIRE.
APPLICATION FILED JUNE 18, 1920.
1,398,862.
Patented Nov. 29, 1921.
2 SHEETS—SHEET 2.
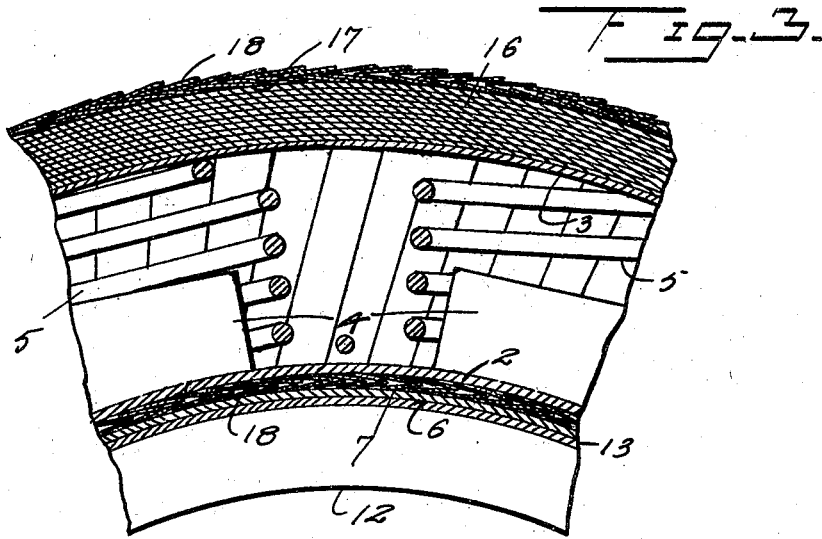
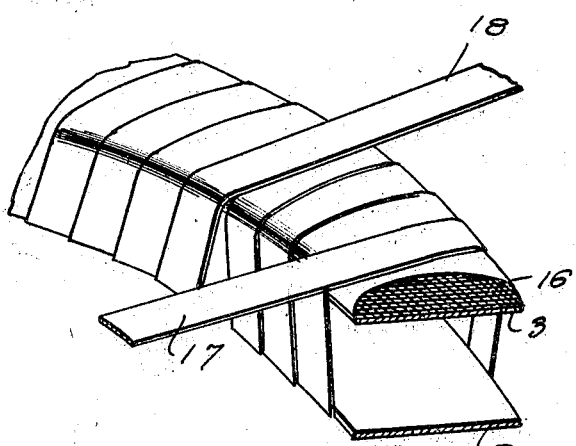
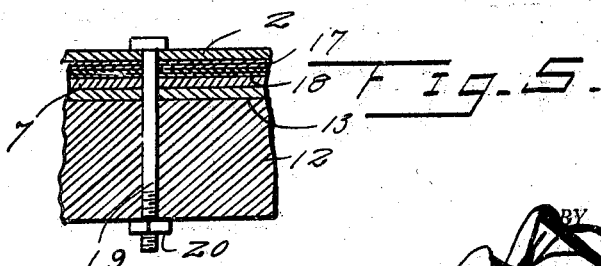
INVENTOR.
Adam John

UNITED STATES PATENT OFFICE.

ADAM JOHN, OF BOSTON, MASSACHUSETTS.

CUSHION-TIRE.

1,398,862.  Specification of Letters Patent.  Patented Nov. 29, 1921.

Application filed June 18, 1920. Serial No. 389,979.

*To all whom it may concern:*

Be it known that I, ADAM JOHN, a citizen of the United States, residing at Boston, in the county of Suffolk and State of Massachusetts, have invented certain new and useful Improvements in Cushion-Tires; and I do hereby declare the following to be a full, clear, and exact description of the invention, such as will enable others skilled in the art to which it appertains to make and use the same.

This invention relates to new and useful improvements in cushion tires and has for its primary object the provision of inner and outer bands cushionly separated and suitably covered to form a tire capable of rendering the desired resiliency without the employment of pneumatic cushioning means, thereby obviating punctures and blow-outs and the expenses caused by such.

Another object of this invention is the provision of a cushion tire of the above stated character which will be simple, durable and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawings, in which:—

Figure 1 is a side elevation partly in section illustrating a cushion tire constructed in accordance with my invention and having the same mounted on a wheel, Fig. 2 is a transverse sectional view illustrating the same, Fig. 3 is a fragmentary longitudinal sectional view illustrating the cushioning means, Fig. 4 is a fragmentary perspective view, illustrating the manner of wrapping the cushioning means, Fig. 5 is a detail sectional view illustrating the means of preventing the rim from having circumferential movement on the wheel.

Referring in detail to the drawings, the numeral 1 indicates as an entirety a cushion tire consisting of inner and outer metallic bands 2 and 3 and the inner band 2 is of a greater thickness than the outer band and has formed thereon combined cushioning and spring protecting blocks 4. Coil springs 5 are secured to the inner and outer bands and surround the cushioning and protecting blocks 4. The inner band 2 rests in a rim 6 consisting of a pair of sections 7 having flanges 8 formed on their outer edges to prevent lateral movement of the inner band and said flanges are connected together at spaced intervals by rods or bolts 9 which extend between the springs and overlie the inner band 2. The rim 6 is mounted on an ordinary felly band 10 carried by a felly 11 of a wheel 12. The felly band 10 has formed upon one edge a flange 13 to prevent lateral displacement of the rim 6 from the band 10 in one direction while removable cleats 14 retain the rim 6 on said felly band 10 against lateral movement in the other direction. The cleats 14 are detachably secured to the felly 11 by bolts 15 engageable with nuts 15$^a$ anchored in said felly, thus providing a construction which will permit the easy removal of the tire 1 from the wheel.

The outer band 3 has mounted thereon padding or tread forming material 16 which is so shaped as to form the tread for the tire 1 and is retained on the band 3 by a strip of fabric 17 wound about the same and the band 21 in spiral formation. A second wrapping 18 of rubberized fabric is placed about the wrapping 17 and is arranged in spiral formation and extending in an opposite direction from the wrapping 17 and is adapted to be subjected to a vulcanizing process so as to be capable of withstanding considerable wear.

The padding 16 may be constructed of rubber or any other material suitable for the purpose.

Bolts 19 extend through the inner band 2, rim 6 and felly 11 and receive nuts 20. These bolts prevent circumferential movement of the tire upon the felly 11.

While I have shown and described the preferred embodiment of my invention, it will be understood that minor changes in construction, combination, and arrangement of parts may be made without departing from the spirit and scope of the invention as claimed.

Having thus described my invention what I claim is:

A cushion tire having an outer band, an inner band concentric therewith and spaced therefrom, relatively large cushioning blocks on the inner band, springs surrounding said blocks and engaging the bands, fabric retaining the bands in operative relation, a channeled rim into which the inner band fits, and fastening means extending transversely of the rim through the fabric and across the inner band.

In testimony whereof I affix my signature in presence of two witnesses.

ADAM JOHN.

Witnesses:
J. FLEONE,
CHRIST VRANIKOS.